INVENTOR.
RENE GOUIRAND

United States Patent Office 2,795,434
Patented June 11, 1957

2,795,434

PNEUMATIC SUSPENSION FOR VEHICLES

Rene Gouirand, New York, N. Y.

Application June 8, 1953, Serial No. 360,110

7 Claims. (Cl. 280—104.5)

This invention is a pneumatic suspension for vehicles and the object of the invention is to provide a strong, durable construction which will properly support light as well as heavy loads with a minimum transmission of shock and jar to the body of the vehicle and to the contents of the latter.

These objects and others are obtained through the use of the novel constructions hereinafter more particularly described and claimed.

The accompanying drawings illustrate different practical embodiments of the invention, but the constructions therein shown are to be understood as illustrative, only, and not as defining the limits of the invention.

Figure 1:
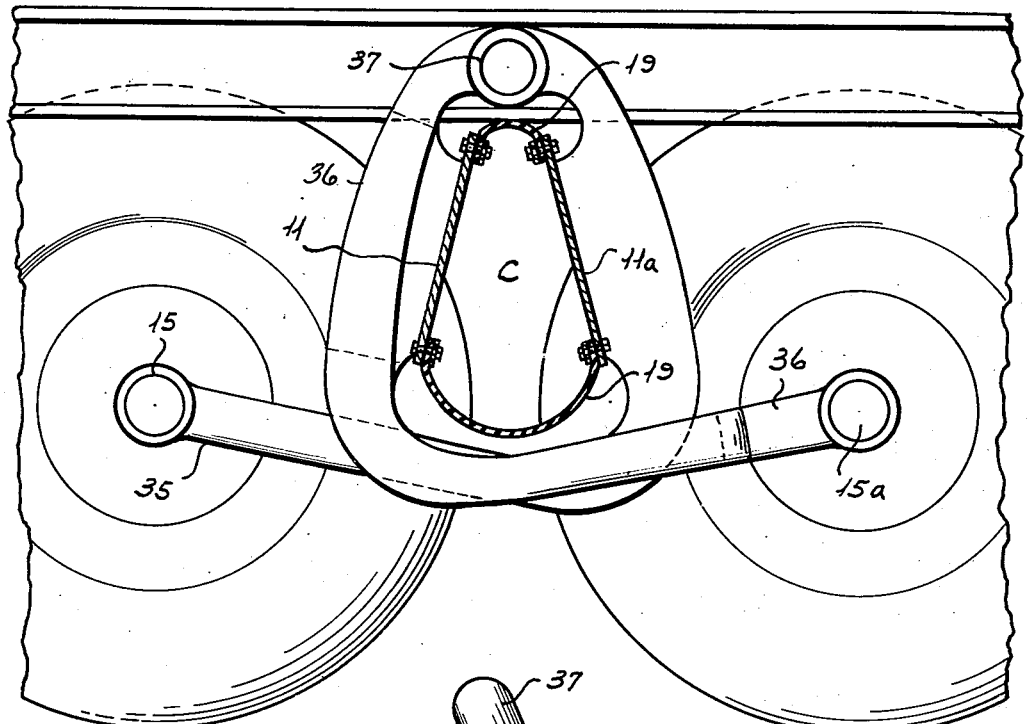
Fig. 1 is a longitudinal section through a vehicle having a pneumatic suspension embodying the present invention with certain parts of said suspension in central section.
Figure 2:
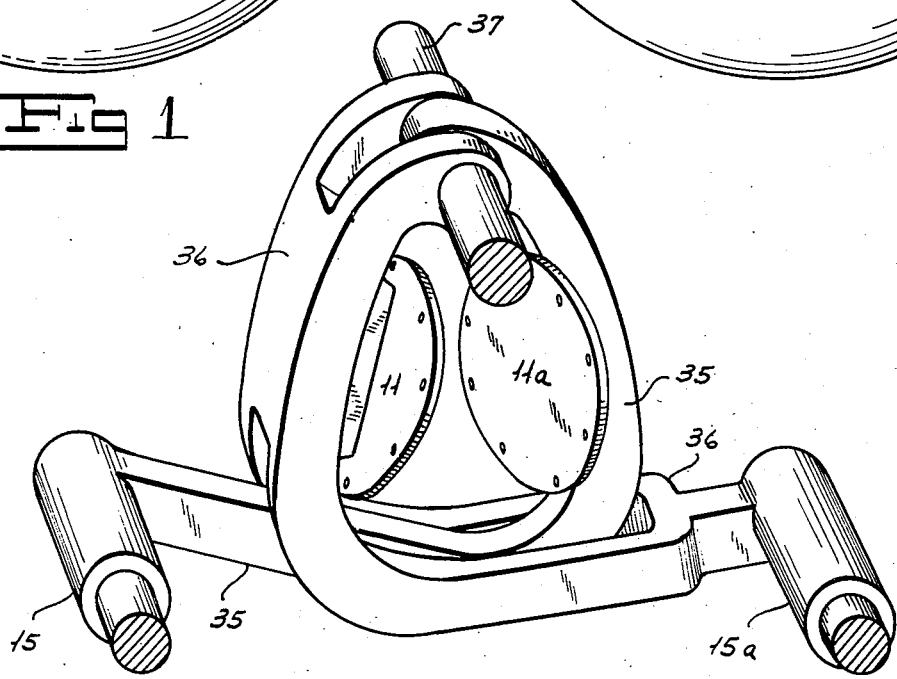
Fig. 2 is a fragmental perspective view showing the relation of the wheel supporting arms in the construction of Fig. 1. In this view, the pneumatic chamber is omitted as are also the wheels and chassis frame.

In Figs. 1 and 2, the wheel spindles 15 and 15a are connected respectively to arms 35 and 36. The arm 35 at each side of the vehicle, extends rearwardly from its wheel spindle 15 to a point beyond a pneumatic chamber C and thence upwardly and is pivoted to a shaft 37 which extends transversely through the frame. The upstanding portion of this arm carries a rear plate 11a. In similar, but reverse manner, each arm 36 extends forwardly to overlap the companion arm 35, thence upwardly and is pivoted to the same transverse shaft 37 or to a different shaft at the same level as may be desired. The upstanding portion of this arm 36 carries a corresponding plate 11. Each of the arms 36 is bifurcated as shown in Fig. 2, to straddle the other arm 35, to permit these arms to independently oscillate about the shaft 37 with due clearance between them. The plates 11 and 11a form the opposite walls of the pneumatic chamber C and they are marginally connected to a flexible wall or casing 19 to form therewith the pneumatic chamber C.

The structure shown is duplicated at both sides of the vehicle so that the wheels have the independent suspension, whereby elevation of one wheel will not affect the position of the other wheel. In the construction shown in Figs. 1 and 2, the raising and lowering movement of the forward spindle will bring about corresponding movement of the rear plate 11a, while similar movement of the rear spindle will bring about corresponding movement of the forward plate 11. The long arms shown in this construction will minimize the transmission of shock to the chassis frame and provide extremely smooth riding.

In the structure of Figs. 1 and 2, I may substitute a hollow spherical ball for the casing 19 shown in Fig. 1, in which event, the plates 11 and 11a of the latter figure are made concave to conform to the shape of the spherical cushion.

Figure 3:
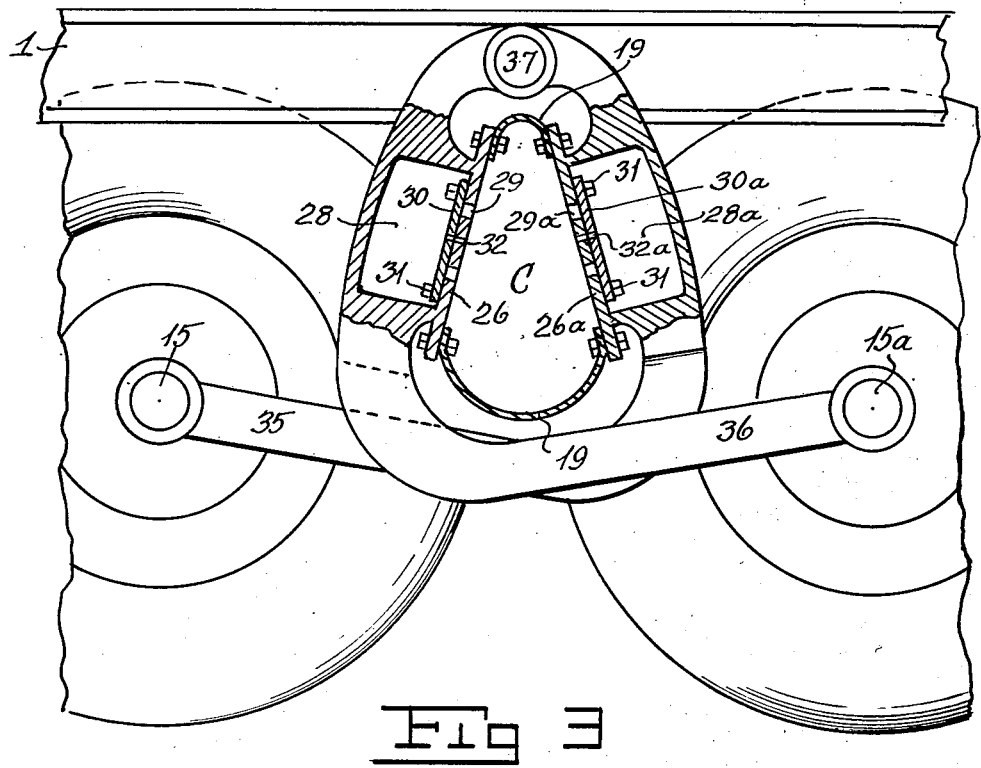
Fig. 3 shows a modified form of the invention.

In Fig. 3, the structure is as in the preceding figures except that each lever carries a chamber, the forward chamber being indicated at 28 and the rear chamber at 28a. The chamber C within the flexible casing 19 and between the walls 26 and 26a constitutes a main pneumatic chamber, while the chambers 28 and 28a form auxiliary air chambers.

Each of the walls 26 and 26a is provided with one or more perforations 29—29a which are normally sealed by elastic check valves 30 and 30a. Each of these elastic check valves may be conveniently in the form of a rubber disk held facially against the wall by screws 31 at the upper and lower portions of the disk, leaving the lateral edges of the disk free from attachment so that the disk may bulge to pass air under pressure from the main chamber C to either of the auxiliary chambers 28 or 28a, according to circumstances presently described. Pressure equalizing holes 32 and 32a, preferably of a smaller size than the holes 29—29a, extend through both the walls 26 and 26a and the rubber check valve disks 32 and 32a.

In practice, the chambers C are charged with compressed air. This may be accomplished by simply introducing the air through a valved nipple leading into each of the chambers C or by feeding compressed air to the chambers from a tank in any suitable way.

I have hereinbefore described different practical embodiments of the invention, all of which are capable of supporting both light and heavy loads with equal facility and without undue wear on any of the operating parts. The pressure carried within the respective pneumatic chambers will of course be such as to adequately support the load though in none of these constructions is excessively high compression required in any of the pneumatic chambers because of the particular arrangement of the structures herein illustrated and elucidated.

In the foregoing detailed description, I have set forth the invention in its preferred practical forms, each of which has its own particular advantages. I wish it understood that some of the features shown in one may be used in other of the forms which I have described, without departing from the invention and that the invention is to be understood as fully commensurate with the appended claims.

Having thus fully described the invention, what I claim as new and desire to secure by Letters Patent is:

1. A pneumatic suspension for a tandem wheeled vehicle having a frame, comprising: tandem wheels at each side of the vehicle, a supporting arm for each of the tandem wheels, each supporting arm being provided at one end with a wheel spindle and pivoted at its other end on a pivot supported on the frame, and a compressed air chamber positioned between the front and rear tandem wheels at each side of the vehicle and having walls adapted to be flexed to increase or decrease the pressure of air in the chamber, the supporting arm of each rear wheel of the tandem bearing against the forward side of the corresponding compressed air chamber while the supporting arm of the forward wheel of the tandem bears against the rear wall of said chamber.

2. A pneumatic suspension for a tandem wheeled vehicle comprising: a plurality of arms one end of each of which is carried by a pivot supported by the frame while the other end of each arm carries a wheel spindle, a walled receptacle mounted on each arm, and a flexible walled casing interposed between the contiguous walls of said receptacles at each side of the vehicle and secured to the walls of said chambers to form a main compressed air chamber, the interiors of said receptacles constituting auxiliary air chambers, the walls of the receptacles intermediate the main compressed air chamber and the auxiliary air chambers being provided with check valved openings to permit valve controlled communication between the several chambers.

3. A pneumatic suspension for a tandem wheeled vehicle having a frame, comprising: at each side of the frame a compressed air chamber positioned below the frame, a lever pivoted to the frame and extending downwardly at the forward side of said chamber to bear against the same and then rearwardly and carrying a wheel spindle at its rear end, and a second lever also pivoted to the frame and extending downwardly at the rear side of the chamber to bear against the same and then forwardly and carrying a wheel spindle at its forward end.

4. A pneumatic suspension according to claim 3, wherein the compressed air chamber comprises opposed rigid plates carried by the levers with a flexible bellows interposed between said plates.

5. A pneumatic suspension according to claim 3, wherein one of the levers at each side of the frame is bifurcated to straddle the companion lever at the same side of the frame.

6. A pneumatic suspension according to claim 3, wherein each arm carries an auxiliary air chamber having communication with the interior of the compressed air chamber.

7. A pneumatic suspension according to claim 1, wherein each arm carries an auxiliary air chamber having communication with the interior of the flexible walled casing.

References Cited in the file of this patent

UNITED STATES PATENTS

| | | |
|---|---|---|
| 1,085,995 | Petter | Feb. 3, 1914 |
| 2,025,793 | Tschappat | Dec. 31, 1935 |
| 2,147,990 | Richter | Feb. 21, 1939 |
| 2,317,057 | Higby | Apr. 20, 1943 |
| 2,442,354 | Gordon, Jr. et al. | June 1, 1948 |

FOREIGN PATENTS

| | | |
|---|---|---|
| 10,749 | Great Britain | May 6, 1909 |